United States Patent [19]

Dennison et al.

[11] Patent Number: 4,794,380

[45] Date of Patent: Dec. 27, 1988

[54] MEANS AND METHOD FOR DETERMINING THE ROTATION DIRECTION OF AN OIL WELL PUMPING UNIT CRANK ARM

[75] Inventors: Jack A. Dennison, Waller; Richard S. Simpson, Houston, both of Tex.

[73] Assignee: Texaco Inc., White Plains, N.Y.

[21] Appl. No.: 78,301

[22] Filed: Jul. 21, 1987

[51] Int. Cl.$^4$ .............................................. G08B 21/00
[52] U.S. Cl. .................................................... 340/672
[58] Field of Search ........................................ 340/672

[56] References Cited

U.S. PATENT DOCUMENTS 3,728,676  4/1973  Brown ................................. 340/672

Primary Examiner—Glen R. Swann, III
Attorney, Agent, or Firm—Robert A. Kulason; James J. O'Loughlin; Ronald G. Gillespie

[57] ABSTRACT

A magnet and two magnetic sensing means are spatially related to each other, with each magnetic sensor sensing the relative movement between the magnet and the magnetic sensor. The magnetic sensor provides a signal corresponding to the relative movement. Circuitry connected to both magnetic sensors provides an alarm in accordance with the signals from both magnetic sensors when the rotation of the crank arm is in one direction and does not provide an alarm when the rotation of the crank arm is in the opposite direction.

4 Claims, 1 Drawing Sheet

MEANS AND METHOD FOR DETERMINING THE ROTATION DIRECTION OF AN OIL WELL PUMPING UNIT CRANK ARM

BACKGROUND OF THE INVENTION

Field of the Invention

The present invention relates to oil pumping units in general.

SUMMARY OF THE INVENTION

The apparatus and method of the present invention detects the rotation of an oil well pumping unit crank arm and includes a magnet and two magnetic sensing means spatially related to each other with each magnetic sensor sensing the relative movement between the magnet and the magnetic sensor. The magnetic sensor provides a signal corresponding to the relative movement. Circuitry connected to both magnetic sensors provides an alarm in accordance with the signals from both magnetic sensors when the rotation of the crank arm is in one direction and does not provide an alarm when the rotation of the crank arm is in the opposite direction.

The objects and advantages of the invention will be described more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE INVENTION

The apparatus of the present invention senses the rotational direction of an oil pumping unit. The direction of the prime mover's crank arm rotation is very critical because undue stress will be added to the prime mover if the rotation is incorrect. The direction of rotation can be inadvertently changed by changing the power phase sequence during maintenance procedures.

Figure 1:
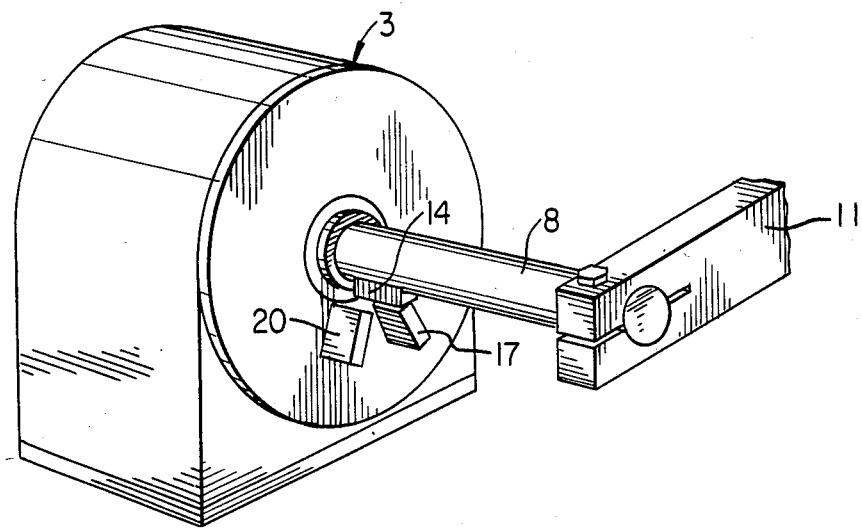
FIG. 1 depicts a portion of an oil well pumping unit with elements of apparatus constructed in accordance with the present invention for detecting rotation of the oil pumping unit's crank arm.

With reference to FIG. 1, there is shown a prime mover 3 which includes shaft 8. Shaft 8 is connected to crank arm 11. Elements 3, 8 and 11 are parts of a conventional oil pump.

A magnet 14 is mounted on shaft 8 while magnetic detectors 17 and 20 are mounted on the housing of 3.

Figure 2:
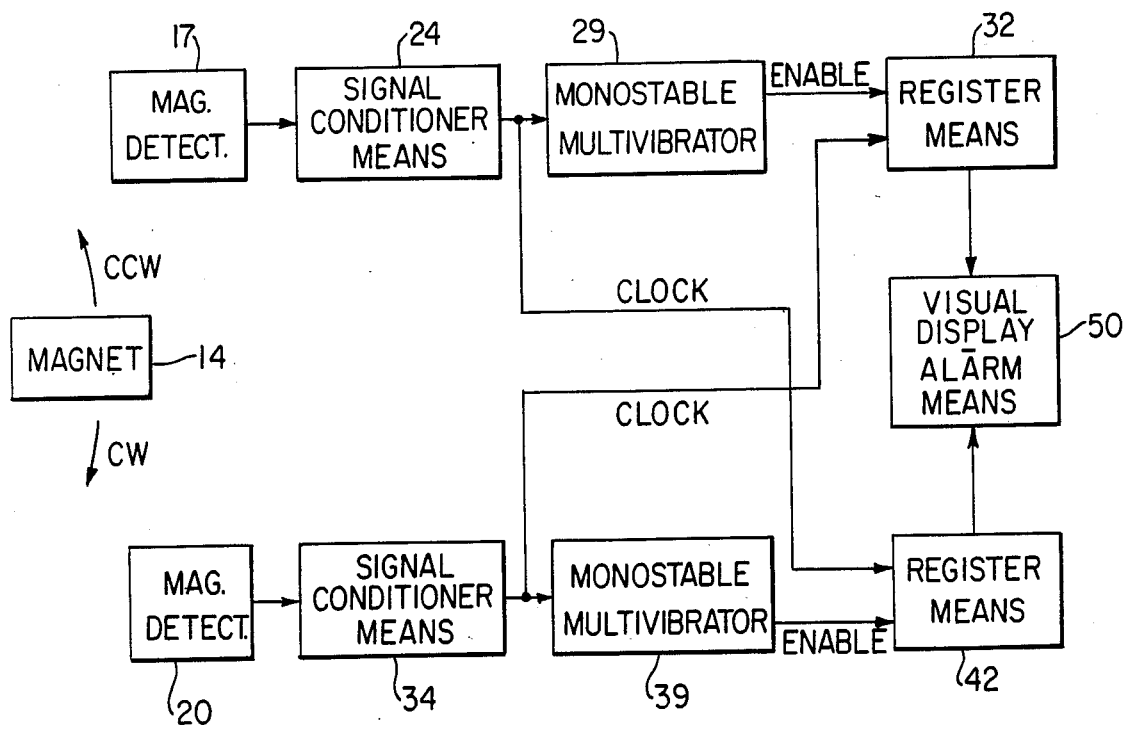
FIG. 2 is a simplified block diagram of the apparatus for detecting the direction of rotation of the oil well pumping unit's crank arm in accordance with the present invention.

With regards also to FIG. 2, as magnet 14 rotates in a direction, say for example clockwise, magnet 14 will first pass magnetic detector 17 causing it to provide a pulse signal to signal conditioner means 24. Signal conditioner means 24 provides a pulse to a monostable multi-vibrator 29 which in turn will provide an enabling pulse to register means 23.

Similarly as magnet 14 continues past magnetic detector 20, detector 20 provides a pulse to signal conditioner means 34 which in turn provides a pulse to a monostable multi-vibrator 39. Monostable multi-vibrator 39 provides an enabling pulse to register means 42.

Signal conditioner means 24 also provides its pulse to a clock input of register means 42. Signal conditioner means 34 also provides its pulse output to a clock input of register means 32.

Thus for a clockwise rotation of shaft 8, monostable multi-vibrator 29 provides an enabling pulse to register means 32 in response to the passage of magnet 14 past magnetic detector 17. Subsequently the pulse provided by signal conditioner means 34, in response to the passage of magnet 14 past magnetic detector 20, provides a pulse which is entered into register means 32. As noted previously, signal conditioner means 24 had provided a pulse to register means 42 but since magnet 14 had not passed magnetic detector 20 it was not entered into register means 42. Thus for clockwise rotational shaft 8 register means 32 will enter a pulse while register means 42 will not.

The opposite is true for counterclock rotation. That is, as magnet 14 passes magnetic detector 20 it will cause register means 42 to be enabled so that a pulse, resulting from the passage of magnet 14 past magnetic detector 17, will be entered into register means 42. Further, at the time signal conditioner means 34 provides a clock pulse means to register means 32 it is not enabled and hence the clock pulse cannot be entered. The outputs of register means 32 and 42 are provided to visual display/alarm means 50 where a visual display is provided and an alarm sounded or flashed or both, depending on how the circuitry is arranged as to determine which direction is detrimental. Further, although the present invention is shown with visual display and alarm means 50, visual display and alarm means 50 may also provide a control signal to shut down the pump to prevent damage.

What is claimed is:

1. Apparatus which detects the rotation of an oil well pumping unit crank arm comprising:
    sensing means including:
    a magnet, and
    two magnetic sensing means, each magnetic sensing means being means for sensing relative movement between the magnet and the magnetic sensing means and providing a signal corresponding thereto; and
    alarm means connected to both magnetic sensing means for providing an alarm in accordance with the signal from both magnetic means when the rotation of the crank arm is in one direction and for not providing an alarm when the rotation of the crank arm is in an opposite direction; the alarm means includes:
    a pair of signal conditioning means, each signal conditioning means being connected to a corresponding magnetic sensing means for providing a conditioned signal in accordance with the signal from the magnetic sensing means,
    a pair of monostable multivibrators, each monostable multivibrator being connected to a corresponding signal conditioning means and providing pulse output in accordance with the conditioned signal from the signal conditioning means,
    a pair of register means, each register means being connected to a corresponding monostable multivibrator and to the signal condition means not connected to the corresponding monostable multivibrator for entering the conditioned signal from the signal condition means when the rotation of the crank arm is in one direction and for providing a signal of one level in accordance with an entered signal and of another level if the conditioned signal is not entered, and alarm device means connected to both register means for providing an alarm when the rotation is in the one direction and for not providing an alarm when the rotation is in the other direction in accordance with the signals from both register means.

2. Apparatus as described in claim 1 in which the magnet is mounted on a shaft of the crank arm and the magnetic sensors are mounted on a housing of the oil pumping unit.

3. A method for detecting the rotation of an oil well pumping unit crank arm comprising the steps of:

locating a magnet and two magnetic sensors in spatial relationship in a manner so that either the magnet or the magnetic sensors are affixed to the crank arm and that which is not affixed to the crank arm is maintained in a fixed position relative to the crank arm, sensing the relative movement between the magnet and the magnetic detectors, providing signals corresponding to the sensed movement, providing an alarm in accordance with the signals from both magnetic sensors when the rotation of the crank arm is in one direction, and not providing an alarm when the rotation of the crank arm is in an opposite direction;

and in which the alarm step includes:

conditioning each signal from a corresponding magnetic sensor to provide a pair of conditioned signals, providing a pair of pulse outputs, each pulse output being provided in accordance with a corresponding conditioned signal, receiving the pair of pulses and the pair of conditioned signals with a pair of registers in the manner so that each register receives a conditioned signal and a pulse output that was not derived from the received conditioned signal, entering a condition signal into one register in accordance with the received pulse output when the rotation of the crank arm is in one direction, entering a received conditioned signal in the other register in accordance with the received pulse output when the rotation of the crank arm is in an opposite direction, providing two output signals, each output signal being provided by a different register and having one amplitude when a conditioned signal has been entered in the register, and having another complitude when a condition signal has not been entered in the register and the alarm step includes providing an alarm when the rotation is in the one direction and for not providing an alarm when the rotation is in the other direction in accordance with output signals provided by the registers.

4. A method as described in claim 3 in which the locating step includes:

affixing the magnet on the shaft of the crank arm, and affixing the magnetic sensors to a housing of the oil well pumping unit.

* * * * *